Dec. 16, 1930.   R. HUGERSHOFF   1,785,448
STEREOSCOPIC MEASURING INSTRUMENT
Filed June 1, 1927
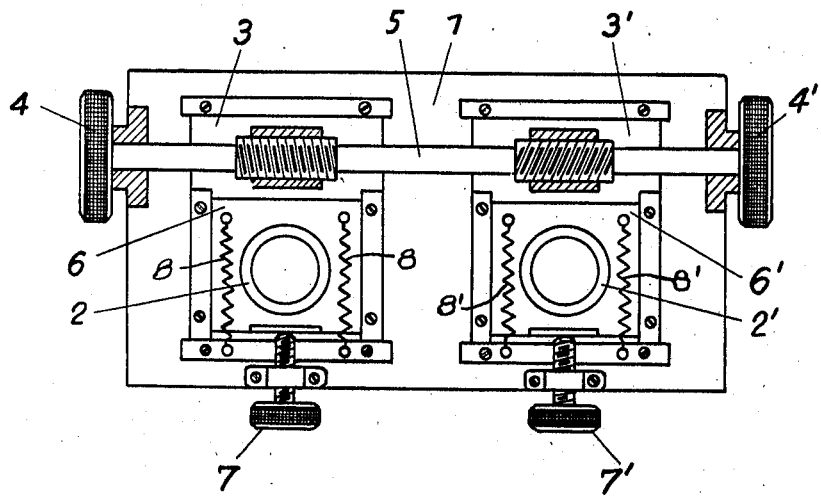
Inventor:
R. Hugershoff
By: Marks & Clerk
Attys.

Patented Dec. 16, 1930

1,785,448

UNITED STATES PATENT OFFICE

REINHARD HUGERSHOFF, OF DRESDEN, GERMANY, ASSIGNOR TO "IKARUS" INTERNATIONALE PATENT-VERWERTUNGS A. G., OF VADUZ IM FURSTENTUM, LIECHTENSTEIN, GERMANY

STEREOSCOPIC MEASURING INSTRUMENT

Application filed June 1, 1927, Serial No. 195,821, and in Germany October 5, 1926.

As is well known, it is only possible for those persons to work with stereoscopic measuring instruments (telemeters, photogrammetric measuring instruments and the like) to whom the binocular observation of two co-ordinated partial images presents a stereoscopic impression. For obtaining this impression the binocular eyepiece of the measuring instrument has to be adapted to the interocular distance of the observer. This is usually effected by making the eyepieces adjustable in the direction of the line connecting the eyes, i. e., horizontally. This arrangement is imperfect, in that it allows only for the interocular distance which is different for different observers, but not for the very frequent difference in height. Experience has shown that in the case of the majority of otherwise normal observers, who ostensibly cannot see stereoscopically, the line connecting the two eyes is not horizontal, the centers of the eyes thus being at different levels.

In order to enable such observers to use an instrument of this kind conveniently, i. e., to make it possible for them to obtain a stereoscopic impression at all, according to the present invention one of the eyepieces or each eyepiece is made adjustable independently of the other perpendicular to the line connecting the two eyes, being for this purpose mounted on a cross-slide arrangement.

The adjustment of one eyepiece in the vertical direction is already known as applied to telemeters. These are however measuring instruments having only a single eyepiece, the adjustment of which has the object of bringing the image back to the centre of the field of view after it has become decentred, for instance through the eyepiece head being turned. The present invention on the other hand, has for its object to provide means for a relative adjustment in the level of the images in stereoscopic measuring instruments, that is instruments of necessity having two eyepieces.

The accompanying drawing shows a constructional example of the invention for the independent vertical adjustment of both eyepieces in elevation and partial section through the adjusting mechanism perpendicular to the optical axes of the eyepieces.

The plate 1 supports the eyepiece mounts 2, 2', each of which is fixed to a cross-slide system. The slides 3, 3' enable the interocular distance to be adjusted in a known manner by turning the threaded spindles 5 provided with the milled heads 4, 4'. The slides 6, 6' which are adjusted by screws having milled heads 7, 7' against the force of springs 8, 8' enable the eyepieces to be adapted to the difference in level of the eyes of the observer.

What I claim is:—

1. A double eyepiece assembly for stereoscopic measuring instruments, comprising the combination with an eyepiece support of a pair of eyepieces mounted on said support and adapted to be displaced horizontally thereon, at least one of said eyepieces being displaceable also upwardly and downwardly, means connected to said eyepieces for simultaneously adjusting the eyepieces towards and away from one another to suit the interocular distance of the observer and means connected to the upwardly and downwardly displaceable eyepiece for displacing said eyepiece upwardly and downwardly independently of the other eyepiece for adjusting the eyepieces to suit the difference in level of the eyes of the observer.

2. A double eyepiece assembly for stereoscopic measuring instruments, comprising the combination with an eyepiece support of horizontal guiding means on said support, a pair of eyepiece slides mounted on said support and slidable along said guiding means, an eyepiece holder on each of said slides, an eyepiece on each of said holders, at least one of said eyepiece holders being displaceable on the slide upwardly and downwardly thereon, displacing means connected to said slides for simultaneously moving the slides towards and away from one another for adjusting the eyepieces to suit the interocular distance of the observer and means connected to said displaceable eyepiece holder for raising and lowering it on the slide independently of the other eyepiece holder.

3. A double eyepiece assembly as set forth in claim 2, in which the displacing means for the eyepiece holder comprises an adjusting screw mounted on the eyepiece support and bearing against a horizontal edge of the eyepiece holder and yielding pressure exerting means connected to the said holder and to the slide so as to press the holder into contact with the adjusting screw.

In testimony whereof I have signed my name to this specification.

REINHARD HUGERSHOFF.